United States Patent
Awada et al.

(10) Patent No.: US 12,542,000 B2
(45) Date of Patent: Feb. 3, 2026

(54) METHOD AND APPARATUS FOR DISTINGUISHING DIFFERENT CONFIGURATION STATES OF AN OBJECT BASED ON AN IMAGE REPRESENTATION OF THE OBJECT

(71) Applicant: Gestigon GmbH, Luebeck (DE)

(72) Inventors: Johanna Awada, Luebeck (DE); Florian Hartmann, Luebeck (DE)

(73) Assignee: Gestigon GmbH, Luebeck (DE)

( * ) Notice: Subject to any disclaimer, the term of this patent is extended or adjusted under 35 U.S.C. 154(b) by 473 days.

(21) Appl. No.: 18/035,629

(22) PCT Filed: Oct. 27, 2021

(86) PCT No.: PCT/EP2021/079834
§ 371 (c)(1),
(2) Date: May 5, 2023

(87) PCT Pub. No.: WO2022/096343
PCT Pub. Date: May 12, 2022

(65) Prior Publication Data
US 2023/0410561 A1    Dec. 21, 2023

(30) Foreign Application Priority Data
Nov. 5, 2020    (DE) .................... 10 2020 129 164.7

(51) Int. Cl.
*G06V 40/20*    (2022.01)
*G06V 10/24*    (2022.01)
(Continued)

(52) U.S. Cl.
CPC ............ *G06V 40/28* (2022.01); *G06V 10/242* (2022.01); *G06V 10/25* (2022.01); *G06V 10/26* (2022.01);
(Continued)

(58) Field of Classification Search
CPC ...... G06V 40/28; G06V 10/242; G06V 10/25; G06V 10/26; G06V 10/50; G06V 10/764;
(Continued)

(56) References Cited

U.S. PATENT DOCUMENTS 7,095,894 B2 *  8/2006  Van Hall ............. G06V 30/245
                                                    382/224
8,768,006 B2    7/2014  Subramanian et al.
(Continued)

OTHER PUBLICATIONS

Extended European Search Report issued in corresponding European Patent Application No. 21802617.7 mailed Jun. 25, 2025 (4 pages).
(Continued)

*Primary Examiner* — Andrew M Moyer
*Assistant Examiner* — Ahmed A Nasher
(74) *Attorney, Agent, or Firm* — Dinsmore & Shohl LLP

(57) ABSTRACT

A method for distinguishing different configuration states of an object based on an image representation of the object involves acquiring original image data representing an original image comprising a picture of the object; detecting the object within the original image; determining an orientation of the detected object; determining a region-of-interest within the original image representing the picture of the object at least in parts; generating normalized image data representing a two-dimensional normalized image by transforming the ROI of the original image based on the determined orientation of the object to a reference frame in which the ROI is represented by the normalized image with a predefined standard orientation and scaling; extracting characteristic features of the object as represented by the normalized image data; and classifying the extracted characteristic features to determine a specific configuration state of the object associated with the classification.

15 Claims, 6 Drawing Sheets

Figure 1:
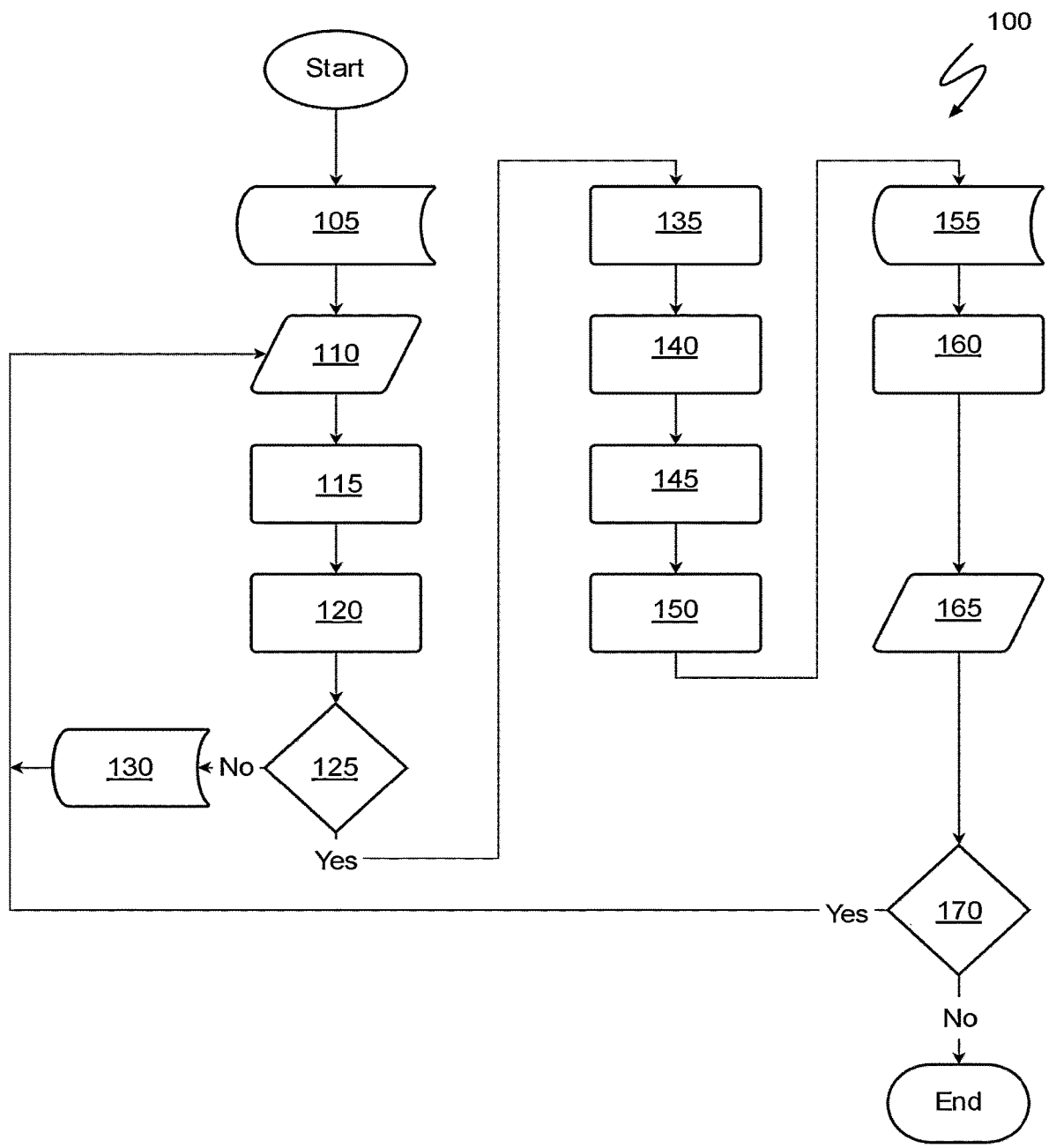

(51) Int. Cl.
  *G06V 10/25* (2022.01)
  *G06V 10/26* (2022.01)
  *G06V 10/50* (2022.01)
  *G06V 10/764* (2022.01)
  *G06V 10/77* (2022.01)
  *G06V 20/64* (2022.01)

(52) U.S. Cl.
  CPC ............ *G06V 10/50* (2022.01); *G06V 10/764* (2022.01); *G06V 10/7715* (2022.01); *G06V 20/64* (2022.01)

(58) Field of Classification Search
  CPC .... G06V 10/7715; G06V 20/64; G06V 10/28; G06V 10/44
  See application file for complete search history.

(56) References Cited

U.S. PATENT DOCUMENTS

| | | |
|---|---|---|
| 2012/0308140 A1 | 12/2012 | Ambrus et al. |
| 2014/0157210 A1 | 6/2014 | Katz et al. |
| 2015/0181679 A1 | 6/2015 | Liao et al. |
| 2017/0097687 A1 | 4/2017 | Pinault et al. |
| 2019/0034714 A1 | 1/2019 | Barth et al. |
| 2019/0213406 A1 | 7/2019 | Porikli et al. |
| 2023/0230337 A1* | 7/2023 | Novotny ................ G06V 20/10 382/195 |

OTHER PUBLICATIONS

Apostol, et al. Using spin images for hand gesture recognition in 3D point clouds. Proceedings of the 18th International Conference on System Theory, Control and Computing (ICSTCC), Sinaia, Romania, Oct. 17-19, 2014, IEEE, pp. 544-549. (6 pages).

Ren Yiyi et al: "Hand Gesture Recognition With Multiscale Weighted Histogram of Contour Direction Normalization for Wearable Applications", IEEE Transactions on Circuits and Systems for Video Technology, IEEE, USA, vol. 28, No. 2, Feb. 2018 (Feb. 1, 2018), pp. 364-377, XP011677106, ISSN: 1051-8215, DOI: 10.1109/TCSVT.2016.2608837 (14 pages).

International Search Report and Written Opinion in corresponding International Application No. PCT/EP2021/079834, dated Feb. 14, 2022 (15 pages).

German Search Report in corresponding German Application No. 10 2020 129 164.7, dated Apr. 6, 2022 (9 pages).

* cited by examiner

METHOD AND APPARATUS FOR DISTINGUISHING DIFFERENT CONFIGURATION STATES OF AN OBJECT BASED ON AN IMAGE REPRESENTATION OF THE OBJECT

The present invention relates to the field of image processing. Specifically, the invention is directed to a method and an apparatus for distinguishing different configuration states of an object based on an image representation of the object, and to a computer program for performing the method.

In the field of image processing, there is frequently a need to detect one or more objects, to distinguish between different objects, or to distinguish between different configurations of an object based on image data representing such one or more objects. Typically, these objects may be oriented arbitrarily, especially in scenarios of changing conditions, such as when the object corresponds to a human user input e.g. in the field of gesture recognition, which makes it difficult to apply basic feature descriptors to the problem.

While in principle, using high computing power as it is currently available today in many applications allows for applying complex pattern recognition algorithms and extensive machine learning to address the above needs, there are nevertheless applications and corresponding system configurations, where only limited computing power is available for the above purpose.

Most common computer vision techniques aim at object recognition and/or object detection, i.e. at determining if and where a specific object is in an image. Exemplary known algorithms for such purposes comprise amongst others: Scale-invariant feature transform (SIFT), Speeded-up robust features (SURF), and Bag-of-Words models.

It is an object of the present invention to provide an improved way of distinguishing different configuration states of an object based on an image representation of the object and with relatively low computing power requirements.

A solution to this problem is provided by the teaching of the independent claims. Various preferred embodiments of the present invention are provided by the teachings of the dependent claims.

A first aspect of the invention is directed to a method, in particular a computer-implemented method, of distinguishing different configuration states of an object based on an image representation of the object. The method comprises: (i) Acquiring original image data representing an original image comprising a picture of the object, e.g. a picture of a human hand; (ii) Detecting the object within the original image; (iii) Determining an orientation of the detected object within the original image; (iv) Determining within the original image a region-of-interest, ROI, i.e. a connected subset of the image points, representing the picture of the object at least in parts; (v) Generating normalized image data representing a two-dimensional normalized image by transforming the ROI of the original image based on the determined orientation of the object to a reference frame in which the ROI is represented by the normalized image with a predefined standard orientation and scaling; (vi) Extracting one or more characteristic features of the object as represented by the normalized image data; and (vii) Classifying the extracted one or more characteristic features according to a related classification scheme to determine among a set of two or more possible configuration states of the object a specific configuration state that is associated with the result of the classification.

The original image may particularly be a two-dimensional (2D) or a three-dimensional (3D) image. In case of a 2D original image, the original image data may particularly have been generated by a 2D-image sensor, such as a suitable 2D-camera. In the case of a 3D-image, the original image data may particularly have been generated by a 3D-image sensor, such as a time-of-flight (TOF) camera. In either case, one or more image pre-processing steps may have been applied to derive the original image data from the image data provided by the image sensors. Alternatively, in both 2D and 3D, the original image data may instead have been created artificially, e.g. by means of computer graphic applications. Specifically, one or both of the original image and the normalized image may be digital images comprising respective image points (i.e. pixels in 2D, or voxels in 3D).

The term "characteristic feature of the object" and the like, as used herein, refers to a feature of the object that defines or co-defines a peculiarity of the object, particularly in an image representation thereof, by means of which at least two different configurations of the object may be distinguished. Some examples of characteristic features will be discussed in more detail below.

The term "classifying" and the like, as used herein, refers to a process of associating a set of one or more extracted features according to a related classification scheme to a selected one of multiple classes defined by the classification scheme. In a simple example, an extracted feature might relate to the ratio of object-related pixels in a given 2D normalized image among all pixels of the normalized image, wherein an "object-related" image point is an image point that represents a respective portion of the object itself within the normalized image. If the object is, for example, a human hand, it may have multiple different configurations (relating to different gestures being performed with the hand. In this example, one of the gestures might be a fist and another one a pointing gesture with the index finger pointing in a particular direction. Each of those two gestures may correspond to a respective class of the classification scheme, e.g. to a class "fist" or "pointing finger", respectively. Specifically, by classifying the extracted ratio of object-related pixels according the classification scheme, a ratio below a given threshold might be associated with the class "fist" while a ratio above the threshold might be associated with the class "pointing finger".

The terms "first", "second", "third" and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Where the term "comprising" or "including" is used in the present description and claims, it does not exclude other elements or steps. Where an indefinite or definite article is used when referring to a singular noun e.g. "a" or "an", "the", this includes a plural of that noun unless something else is specifically stated.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Accordingly, the method of the first aspect does not depend on extensive use of computing power and can nevertheless provide a particularly robust process for distinguishing different configurations of an object based on a normalized representation of the object in a particular reference frame, such that the classification step may be defined independent from a size and orientation of the object in its representation in the original image and in a way that is optimally adapted to the normalized representation of objects in the reference frame.

In the following, certain preferred embodiments of the method will be described, which can be arbitrarily combined with each other or with other aspects of the present invention, unless such combination is explicitly excluded or technically impossible.

In some embodiments, the normalized image is a digital image and at least one of the characteristic features of the object is extracted based on histogram data, wherein the histogram data represents a histogram that associates each row of at least a subset of the rows of image points of the normalized image along a selected one of the normalized image's dimensions with a respective rate or number of object-related image points in the respective row, wherein an object-related image point is an image point that represents a respective portion of the object within the normalized image. Using histogram data in this way has the advantage that only very little computing power is needed for the extraction process. Furthermore, the extraction process, once known, may be implemented rather efficiently in terms of code size and computing time, which makes it particularly suitable for installations having restricted computing resources. Unlike in the case of machine learning methods, esp. such involving artificial neural networks, the method of the first aspect and particularly the histogram-based extraction process do not require any prior training or training data and can be implemented in a very transparent way thus allowing for direct configuration control over the method (unlike some "black box" solutions in the field of machine learning).

The meaning of the term "row", as used herein, relates to a straight line of image points in any dimension of a multi-dimensional digital image. It is thus not limited to the case of a horizontal row in a pixel matrix, but may, for example, relate in other cases to a vertical column of a pixel matrix.

Specifically, in some related embodiments, the at least one characteristic feature of the object is extracted based on a number or ratio of object-related image points in a first subset of the rows along said dimension of the normalized image and a number or ratio of object-related image points in a second, different subset of the rows of the same dimension of the normalized image. For example, the first subset may be formed from one or more rows in one section of the histogram along said dimension and the second subset may be formed from one or more rows in another section of the histogram along the same dimension, wherein the two sections may be distinct or even partially overlapping. These embodiments are particularly suitable for distinguishing object configurations that differ in their representation in the normalized image by the number of object-related image points in different portions of the normalized image. Referring again to the above simple example of the fist and pointing gestures of a human hand, a fist will typically have a much lower variation of the number of object-related image points along a given dimension of the normalized image than a hand with a pointing index finger, wherein a section covering the index finger much less object-related image points will be present than for example in a section covering the palm region of the hand. Some further, more complex exemplary gestures will be discussed below with reference to the figures.

In some of the histogram-related embodiments the method further comprises detecting within the normalized image at least a subset of those rows along said dimension of the normalized image that comprise multiple discrete row segments, each row segment consisting of object-related image points and each row segment being separate from its one or more neighboring row segments of the same row by a gap consisting of at least one image point that is not an object-related image point. In addition, the extracting of the at least one characteristic feature of the object is further based on the presence of one or more of such gaps in at least one of said rows of the normalized image. Accordingly, these embodiments provide yet another independent way of distinguishing different object configuration based on histogram data, in particular the same histogram data as for the embodiments discussed immediately above. Specifically, these different embodiments may even be combined to define an even more powerful process for distinguishing different object configurations based both on different subsets of the rows and the presence of gap.

Specifically, in some gap-related embodiments the extracting of the at least one characteristic feature of the object is based on one or more of (i) the number, (ii) the sizes, (iii) the locations of the one or more gaps, and (iv) for at least one selected gap, the number of contiguously neighboring rows having a corresponding gap being interconnected with the selected gap either directly or via one or more other gaps. All of these options are particularly simple to implement and require very little computing power while providing a wide range of powerful possibilities for further improving the discriminating capabilities of the method with respect to different object configurations.

Furthermore, referring to option (iv), in some of these embodiments, the extracting of the at least one characteristic feature of the object based on the presence of one or more of gaps in at least one of said rows of the normalized image is predominantly or solely based on that set of gaps within the normalized image that comprises the greatest number of contiguously neighboring rows having a corresponding gap being interconnected with the selected gap either directly or via one or more other gaps. This approach adds even more robustness to the extraction process, because it may avoid extraction errors caused by small image errors occurring in only one or a small number of rows.

In some further gap-related embodiments, at least one of the gaps is identified by scanning a respective row of the normalized image for transitions from an object-related image point to a non-object-related image point and vice versa. This is a particularly efficient, esp. time efficient, and robust process for identifying gaps, which based on its simplicity also does not require much computing power.

In some embodiments, the method further comprises preprocessing the original image data before detecting the object therein to improve the image quality of the image represented by the original image data. Specifically, such preprocessing may comprise noise reduction, removal of image artifacts, other filtering, or other known image optimization processes serving the purpose of increasing the robustness of the method against image defects or other image insufficiencies in the original image data.

In some embodiments, determining the spatial orientation of the object within the original image is based on one or more of: (i) an orientation of (i-1) a bounding box, e.g. of a rectangular bounding box, enclosing the object, (i-2) of a contour of the object, or (i-3) of an arrangement of two or more extreme points on the contour of the object within the original image; (ii) a distribution of object-related image points within a bounding box enclosing the object; (iii) an orientation defined by the relative position of a specific extreme point of the object and (iii-1) the geometric center or (iii-2) the center of gravity of the object or (iii-3) another extreme point of the object; (iv) amplitude image data representing a amplitude image of the object and being provided as part of or in addition to the original image data; and (v) depth image data representing a depth image of the object and being provided as part of or in addition to the original image data. Using a bounding box has the particular advantage that the bounding box may at the same time already serve as a suitable region of interest and typically its orientation is easy to determine, especially in the case of a rectangular bounding box. Option (iii) is also particularly simple in its implementation and requires only minimal computing power. Options (iv) and (v) are in particular useful for further increasing the robustness of the method by adding further information on the object as input data.

In some embodiments, generating the normalized image data comprises transforming the ROI to the reference frame by means of an affine transformation. An affine transformation has the advantage that it preserves straight lines and parallelism and the length ratio of any two given segments of a given straight line as invariant properties. Accordingly, such invariant properties of the original image will also be preserved during the transformation to the normalized image and are thus readily available for the subsequent extraction of characteristic features.

In some embodiments, generating the normalized image data comprises transforming the ROI to the reference frame in such a way that the thus-transformed image of the ROI completely coincides with the normalized image. This approach for an optimal size and resolution of the normalized image and thus a particularly effective and robust basis for the subsequent feature extraction and further processing in the course of performing the method, since the amount of irrelevant image data to be dealt with is reduced or even minimized.

In some embodiments, the original image data comprises a sequence of contiguous image frames, e.g. video data with a sequence of video frames, and the method further comprises: maintaining history data representing for each image frame of at least a subset of the sequence the respective classification result that was previously determined for the corresponding image frame, wherein the subset is a contiguous series of image frames that each picture the object, at least in parts. Furthermore, the determining a current configuration state of the object is based on the result of the classification of a current image frame and the history data. Specifically, the object may be a body part such as an extremity of a person, e.g. a hand or a whole arm. Using such history data in addition to the classification result for a current image frame can be advantageously used to further increase the robustness of the method, in particular of its discrimination power for distinguishing (i.e. discriminating) different object configurations.

Specifically, in some of these embodiments, the current configuration state of the object is determined based on a majority decision or averaging with respect to the result of the classification of the current image frame and the classification results represented by the history data. In this way a simple yet powerful and robust decision process can be defined that takes into account both the history data and the classification result for a current image frame. The amount of history data may also be scaled by means of configuration in such a way that only a subset of the available history data, such as only a number of one or more of the most recent classification results in the history data, are considered for the decision. It is also possible to apply an individual or group-wise weighting to each of the various classification results in the history data, in particular in such a way that older classification results have less weight than more recent ones and thus have less impact on the decision.

In some embodiments, the original image data represents a human hand as an object. Specifically, in some of these embodiments and the method is configured to distinguish, when a gesture is performed by the hand, a pointing gesture from a swiping gesture based on classifying one or more characteristic features of the hand being extracted from the normalized image data.

A second aspect of the present invention is directed to a computer program or non-transitory computer-readable storage medium comprising instructions that, when executed on a computer or multi-computer platform, cause the computer or multi-computer platform, respectively, to perform the method of the first aspect of the present invention.

The computer or computer-readable storage medium may in particular be implemented in the form of a data carrier on which one or more programs for performing the method are stored. Preferably, this is a data carrier, such as a CD, a DVD or a flash memory module. This may be advantageous, if the computer program product is meant to be traded as an individual product independent from the computer platform on which the one or more programs are to be executed. In another implementation, the computer program is provided as a file on a data processing unit, in particular on a server, and can be downloaded via a data connection, e.g. the Internet or a dedicated data connection, such as a proprietary or local area network.

A third aspect of the present invention is directed to an image processing apparatus for distinguishing different configuration states of an object based on an image representation of the object, the image processing apparatus being configured to perform the method of the first aspect of the present invention.

The image processing apparatus may accordingly have a program memory in which the computer program of the second aspect is stored or may comprise said data carrier storing the computer program. Alternatively, the image processing apparatus may also be set up to access a computer program available externally, for example on one or more servers or other data processing units, via a communication link, in particular to exchange with it data used during the course of the execution of the computer program or representing outputs of the computer program.

Figure 2:
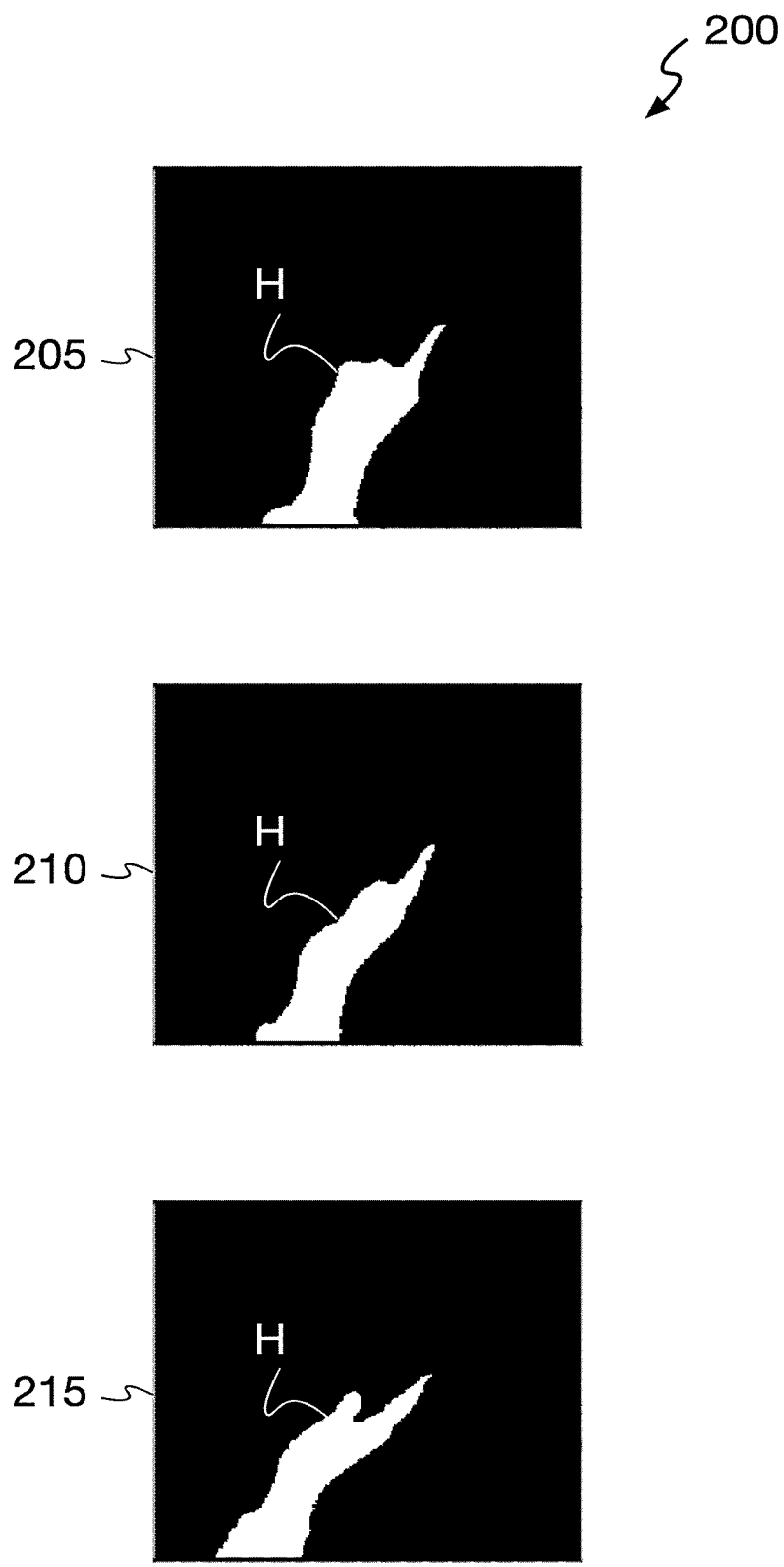
Figure 3:
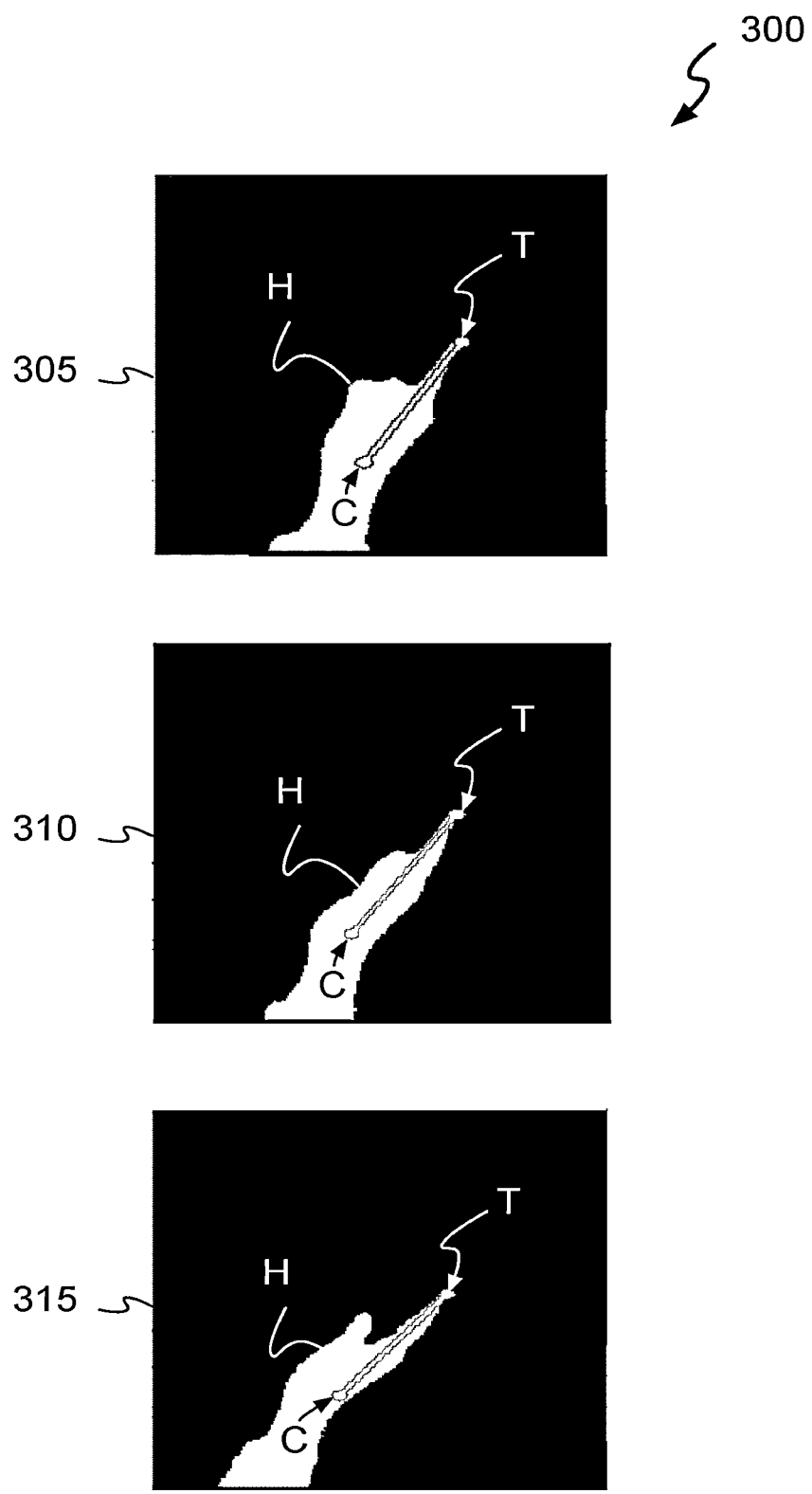
Figure 4:
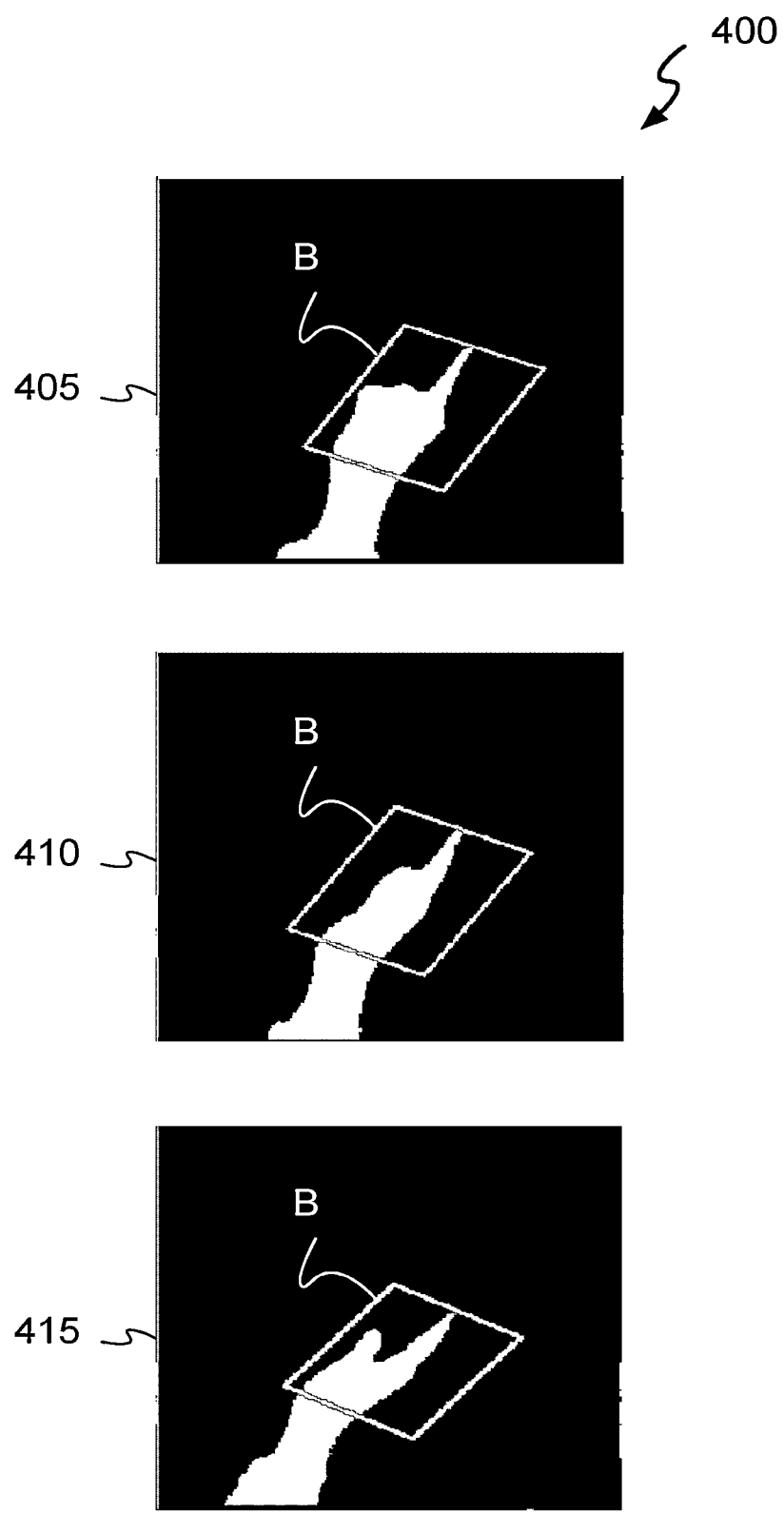
Figure 5:
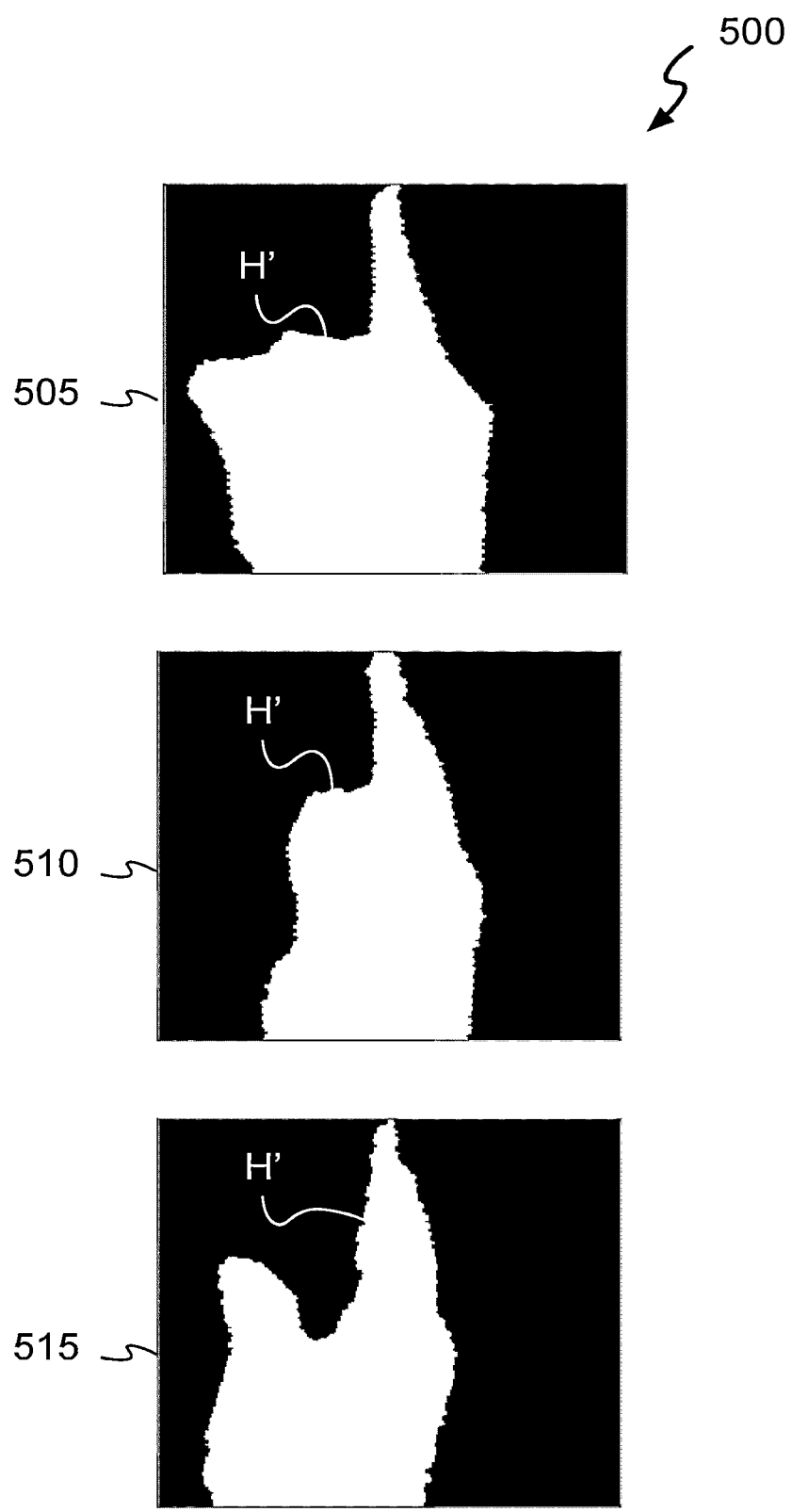
Figure 6:
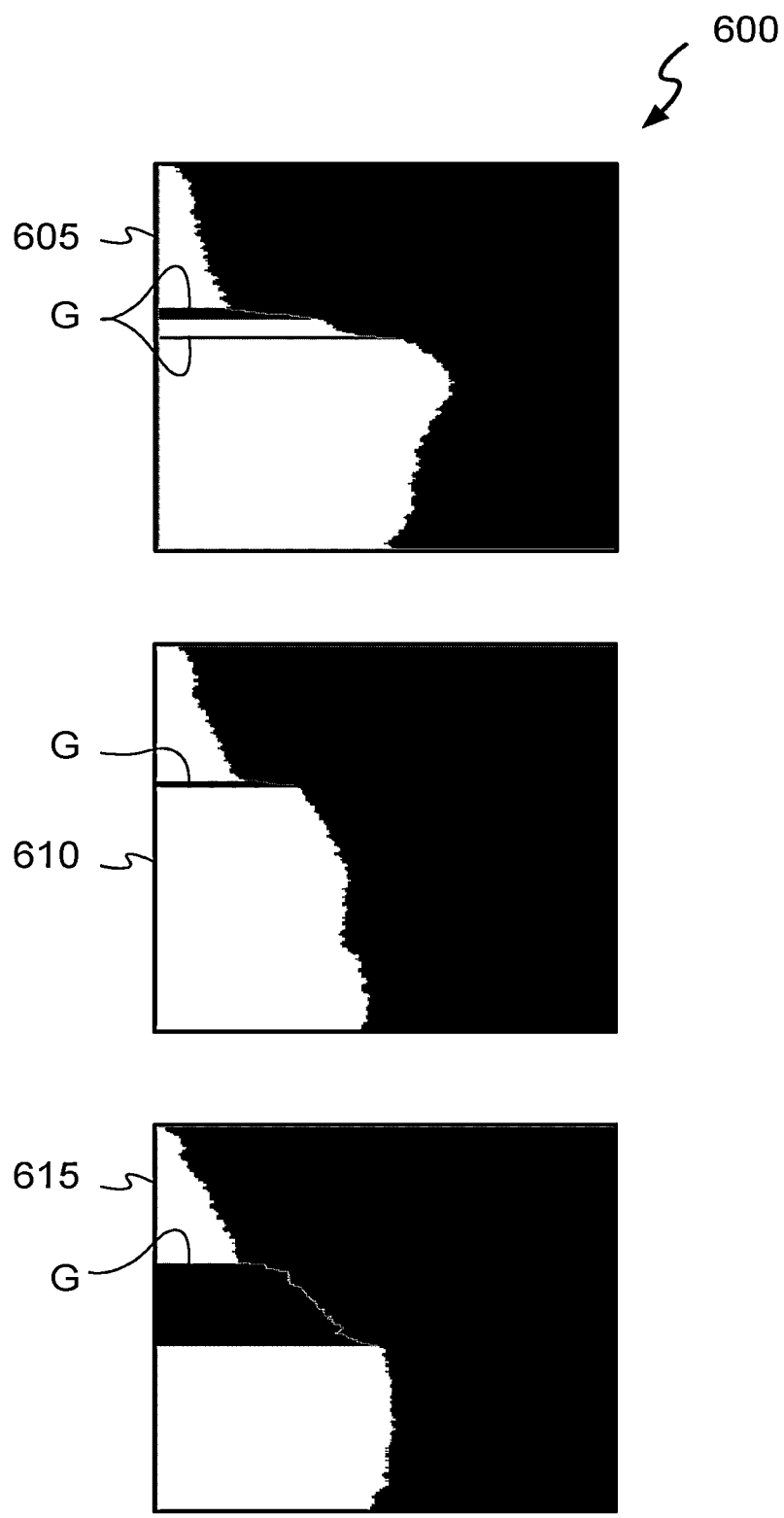

The various embodiments and advantages described above in connection with the first aspect of the present invention similarly apply to the other aspects of the invention. Further advantages, features and applications of the present invention are provided in the following detailed description and the appended figures, wherein:

FIG. 1 schematically illustrates a flowchart illustrating an exemplary method of distinguishing different configuration states of an object, according to an embodiment of the present invention;

FIG. 2 a set of three images, each illustrating an original image of a respective pictured hand gesture;

FIG. 3 the same set of three images as in FIG. 2, with an additional illustration of a respective orientation descriptor per image;

FIG. 4 the same set of three images as in FIG. 2, with an additional illustration per image of a respective region-of-interest, ROI, being encapsulated by a related bounding box that is oriented according to the related orientation descriptor of FIG. 3;

FIG. 5 a set of three normalized images resulting from transforming the respective ROI of each image of FIG. 4 by means of an affine transformation to a normalized reference frame; and FIG. 6 a set of three histograms corresponding two the respective images of FIG. 5; wherein each histogram reflects the number of object-related image points (pixels) her horizontal line of the respective image of FIG. 5.

In the figures, identical reference signs are used for the same or mutually corresponding elements of the invention described herein.

DETAILED DESCRIPTION OF EMBODIMENTS

FIG. 1 illustrates an exemplary embodiment 100 of a method of distinguishing different configuration states of an object, in particular of a human hand. Method 100 starts with step 105, wherein a history log for extracted features is initialized. The log may for example be stored in a memory device, such as a ring buffer memory. Initializing may particularly comprise erasing prior history data stored in the buffer memory and relating to an earlier execution of the method, which is no longer relevant, thus avoiding that any of such prior history data is special is erroneously considered in a current execution run of the method. The role of history data in the context of the present method will be explained further below.

In a further step 110 of method 100, input data in the form of original image data representing a 2D or 3D original image comprising a picture of an object of interest is acquired, for example by receiving a respective image data stream or image data file via a suitable data interface. Three different examples of such original images 200 are provided in FIG. 2, wherein each of the individual images 205, 210 and 215 shows a respective 2D still matrix picture of a human hand H while performing a respective gesture, which may particularly be a free-space gesture. Each of the gestures shown in FIG. 2 may particularly relate to either one of a still or dynamic pose of a hand pointing at an object in a scene or a dynamic swiping movement, such as a swiping gesture as known from gesture-based inputs on touch screens. However, the different configurations of the hand H, as pictured in the different images 205, 210 and 215, respectively, are very similar to each other and can thus typically not be distinguished in a trivial way, at least not by currently known computer programs having only low requirements for computing power.

Images 205, 210 and 215 may particularly be acquired or have been acquired by a sensor or camera observing a region of interest within a scene, e.g. an interior space of a vehicle, such as of an automobile, and more specifically, a space section within such interior space that is used by a driver or passenger of the vehicle to perform free-space gestures for controlling one or more functionalities of the vehicle, e.g. functionalities of an entertainment system thereof. Without limitation, each original image may particularly be either one of (i) a mask image, where single binary image points are just set to true, if the respective image point is object-related, i.e. forms part of the representation of the picture of the object itself (and not the background) or false if it is not object-related; (ii) a single channel (greyscale) image, where the intensity of a single data point relates to amplitude, depth value (in the case of a 3D image), or the confidence acquired by the sensor at this position (iii) a multi-channel (color) image, where an image point is represented by related values of multiple color channels, e.g. in the RGB color space, or (iv) a combination of two or more of the aforementioned options (i) to (iii). Specifically, images 205, 210 and 215 of the present example are mask images per option (i), where the object-related image points (pixels) having the binary value "true" (or "valid") are drawn in white color and are each contributing to the overall representation of the hand H in the respective image of FIG. 2.

In order to improve the image quality of the original image, in a further step 115, the acquired original image data is preprocessed, which may particularly comprise clearing the input data from unnecessary and unwanted data, such as noise or artifacts, that would otherwise introduce wrong data values into the subsequent image processing chain.

Then, in a further step 120, method 100 determines based on the preprocessed original image data, whether or not an object, particularly a specific object of interest, is represented by the preprocessed original image. Such determination may particularly be based on an image segmentation, e.g. a foreground vs. background segmentation, being performed relative to the preprocessed original image data, on a subsequent size estimation of single segments resulting from the segmentation, and/or on a comparison of the results of such segmentation and/or estimation to respective reference information characterizing the object of interest. For example, the segmentation process may provide data characterizing one or more clusters of interconnected foreground image points. A simple way of determining, whether a particular cluster pictures an object, particularly an object-of-interest, is to determine a number of image points in the cluster and compare it to a suitable predetermined threshold corresponding to an expected number, e.g. a set minimum number of image points per cluster representing such an object of interest.

If no relevant object has been detected (125—no), method 100 resets the history log for previously extracted features in a step 130 and branches back to input data acquisition step 110 for yet another object detection attempt. Otherwise (125—yes), i.e. if a relevant object, e.g. a hand, has been detected based on step 120, one or more orientation descriptors characterizing an orientation of the detected object are determined in a step 135. This step is included as a means for determining (i) a region-of-interest, ROI, within the preprocessed original image that covers the picture of the detected object, at least in parts, and (ii) one or more parameters of an affine transformation to be applied to the ROI of the preprocessed image, as will be described further below with reference to steps 140 and 145.

In step 135, a suitable orientation descriptor may particularly be derived from features of the preprocessed image that are easy to determine, like an outline or one or more extreme points of the detected object or of added auxiliary image features, such as a calculated virtual bounding box of a given shape and enclosing the picture of the detected object. Additionally, more complex combinations of basic features can be used to define the object, its main orientation and the region of interest for the subsequent steps, e.g. the distribution of object-related data points in a bounding box or the position of specific extreme points of the object in relation to the center of gravity of the object.

Results 300 of an exemplary process for determining an orientation descriptor each of the images of FIG. 2 is illustrated in FIG. 3, wherein images 305, 310, and 315, are derived from images 205, 210 and 215 of FIG. 2, respectively, by adding an illustration of a respective straight line extending between a determined extremal point of the hand, namely a presumed fingertip T, and a calculated geometric center C of the hand, i.e. of the area covered by the (white) pixels representing the hand H itself. For example, T may be selected to be that particular object-related point which is most distant from point C. The orientation of the straight line, which can be easily determined and mapped to the respective set of orientation parameters, e.g. one or more angles, provides an orientation of the object, i.e. of the hand H. Furthermore, a distance between points T and point C may be determined relative to each of the two dimensions of the image, i.e. a horizontal distance and a vertical distance.

Referring now to a further step 140, a respective ROI may be determined for each of the images in a ROI-determination process 400 as illustrated in FIG. 4. Process 400 is based for each of the three preprocessed images, on the respective orientation descriptor that was previously derived by process 300 of FIG. 3. The ROI of an image may particularly be determined to be a rectangular area, such as a bounding box B, extending in one dimension along the straight line between points T and C and having a lateral extension (width) that is large enough to cover a sufficient portion, ideally all of the object-related image points being present in the lateral dimension, i.e. in a direction extending perpendicularly from said straight-line. Examples of such bounding boxes B, which each define their respective ROI, can be seen in the set 400 of images in FIG. 4 for each of images 405, 410 and 415 being derived from the respective images 305, 310 and 315 of FIG. 3. The size, position, and orientation of the ROI in the preprocessed original image provides a basis for the definition of the affine transformation.

Now, the actual affine transformation may be first determined and then performed in a further step 145. The transformation serves to transforming the ROI, i.e. the image region enclosed by the bounding box B, based on the image descriptor(s) determined in previous step 135 to a reference frame in which the ROI is represented by a normalized image with a predefined standard orientation and scaling. Accordingly, in the reference frame, feature detectors may be applied under always similar conditions, i.e. independent from a specific orientation or size of the object in the original image.

In 2D, an image point $$\begin{pmatrix} x \\ y \end{pmatrix}$$

of the input image, i.e. in the ROI in the preprocessed original image, is transformed by the affine transformation into a point $$\begin{pmatrix} u \\ v \end{pmatrix}$$

by a matrix multiplication with a transformation matrix $M \in \mathbb{R}^{2 \times 3}$:

$$\begin{pmatrix} u \\ v \end{pmatrix} = M \cdot \begin{pmatrix} x \\ y \\ 1 \end{pmatrix}. \quad (1)$$

Once the ROI has been identified in step 140, at least three reference points $$\begin{pmatrix} x_i \\ y_i \end{pmatrix}$$

with i=1, 2, 3 have to be defined in the input image in order to be able to determine the transformation matrix M based thereon. By setting the corresponding target points $$\begin{pmatrix} u_i \\ v_i \end{pmatrix}$$

at the bounds of the destination image of the transformation, i.e. the normalized image to result from the transformation, the ROI represented by the input data, i.e. the preprocessed image data, is mapped by the transformation to the normalized image such that each image point of the normalized image corresponds to a respective image point in the ROI within the preprocessed original image. Of course, in the alternative, a different mapping may be used instead, such that the size of the destination region corresponding to the ROI can be chosen according to the needs of a particular relevant application.

Subsequently, M can be determined by solving $$\begin{pmatrix} u_i \\ v_i \end{pmatrix} = M \cdot \begin{pmatrix} x_i \\ y_i \\ 1 \end{pmatrix}. \quad (2)$$

Once the transformation matrix M has been determined from equation (2) the actual transformation may be performed according to equation (1). Exemplary results 500 of such a transformation are shown in FIG. 5. Images 505, 510 and 515 result from the affine transformation of corresponding preprocessed original images 405, 410 and 415, i.e. of the respective bounding box B defining the ROI. Accordingly, each of the transformed, i.e. normalized images 505, 510 and 515 shows a transformed picture H' of the respective hand gesture in a normalized orientation and scale.

Now, in a further step 150, orientation and scale invariant features of the images of FIG. 5 can be extracted. The following, two exemplary different kinds of features will be used to distinguish the three hand configurations associated with the different images. For the first feature, a row-wise histogram (resulting from rearranging the pixels in the horizontal dimension of the images of FIG. 5 into a first row segment comprising all object-related pixels (white) and a second row segment comprising the background pixels (black) of all object-related pixels is calculated after transformation of the ROI. An exemplary result of applying this histogram determination process to the individual images of FIG. 5 can be seen in FIG. 6. Of course, there is no need to actually plot such a histogram in one way or another. Rather, what matters is the calculation of the mathematical properties of the histogram, in particular the distribution of the number of object-related pixels across the second dimension (in this example: the vertical dimension).

In fact, the respective first image 205, 305, 405, 505 and 605 in each of FIGS. 2 to 6 relates to a pointing gesture where a pointing finger, e.g. the index finger of the hand, is extending away from the rest of the hand. As can be seen from image 605 in FIG. 6, a pointing finger has only relatively few object-related pixels in the first (top) section of the histogram while the curled fingers and back of the hand yield a high number of object-related pixels in the lower section of the histogram covering the remaining rows (center and lower parts of image 605). This means that especially for a first configuration to be distinguished, where the hand is pointing with a single finger, the histogram shows a significant, "chicken leg"-like form. Based on this shape a ratio of object-related (white) pixels in the first (top) rows vs. the other rows (center and bottom) can be defined as a feature to identify a possible pointing configuration of the hand.

On the contrary, a swiping hand that is held vertically, i.e. the back of the hand is turned to the side with respect to and only a side portion of the hand is visible in the original image, as in image 210 of FIG. 2, has a more equally distributed amount of pixels across all rows, which results in a different ratio, as can be seen in the histogram in image 610 of FIG. 6.

While the first feature, i.e. the characteristic "chicken leg" shape in the histogram of the transformed ROI, is suitable for most cases to distinguish pointing and swiping configurations of a human hand, a swipe with a vertical hand, where the thumb is spread away ("over-lapping case") as in image 215 of FIG. 2, could result in a histogram that has similarities with the pointing finger case of image 605.

To support the first feature in such an overlapping case, a second feature is defined: Here, a significant gap G between the thumb and the hand H is visible in the original image 215. After the transformation in step 145, it is possible to detect such gaps G by scanning the changes from object-related to non-object-related pixels and vice versa in each row of the corresponding histogram of image 615. If a change happens more than two times in a given row, this is an indicator for a gap G. To avoid small errors in single rows due to data artifacts, one may consider for this second feature only those rows, which together form the largest area of contiguous rows having each such a gap. If this number of rows is rather small, it is likely that the original image does not show a swiping gesture (configuration state) but rather instead a pointing gesture (configuration state) of the hand.

For the sake of illustration, the rows containing an identified gap G are also colored black in the respective histograms in FIG. 6 and thereby marked, although, in fact, they do relate to object-related pixels which would normally be shown in white, if it wasn't for this marking. Accordingly, based on this second feature, also the two "swiping gesture" configuration states of images 210 and 215 can be distinguished from each other and specifically also from the pointing configuration of image 205 although they are very similar and even in cases where the first feature, when considered alone, might not yet provided reliable results.

Once a preliminary determination has been made as to which hand configuration state has been identified in the current execution run of the method, in a further step 155, this preliminary determination is stored in the history log for further use and subsequent execution runs of method.

Then, in a further step 160, a final decision is taken as to which configuration state, i.e. class, of the hand H, i.e. the object, has been identified. This is done by means of classifying the one or more features that were extracted from the normalized image using a classification scheme, which defines at least two classes, namely a "pointing finger" class and a "swiping movement" class in the present example. Instead of a single "swiping gesture" class, there might be two such classes, one relating to a swiping gesture without a gap between the thumb and the rest of the hand and one relating to a swiping gesture with such a gap. In exemplary method 100, this final decision is, however, not only based on the identification result of the current execution run, as represented by the preliminary determination, but also on previous determinations as reflected in the history log. In particular, such previous determination is made in relation to one or more image frames of the original image data that immediately precede the image frame used for current execution run. In fact, method 100 is structured in such a way, that the history log only contains determinations that have been made during a time frame during which the object in question has always been present, i.e. has been detected each of the frames covering that timeframe, because otherwise the combination of steps 125 and 130 would have reset the history log.

A simple and effective way of taking the final decision is to define it as a majority decision over the individual determinations represented by the culinary determination of the current execution run and all of the previous determinations stored in the history log. Of course, it is also possible to define other ways of consolidating the various different determinations, e.g. by determining the final decision based on a weighted or unweighted average or median of the individual determinations and for example some sort of rounding mechanism. If there are for example in total four determinations of a "swiping" configuration, which each can be represented by a value "1" and in addition a total of two determinations of a "pointing" configuration state, which each can be represented by value "0", an unweighted average yields a value of $m=\frac{2}{3}$, which can be rounded to become "1", such that the final decision yields "swiping" configuration. Typically, relying on history log in addition to the preliminary determination of a respective (single) current execution run makes the method more robust.

Finally, the result may be output in a further step 165 and a decision may be taken in further step 170, whether or not to continue the execution of the method 100 with another execution run by branching back to step 110.

While above at least one exemplary embodiment of the present invention has been described, it has to be noted that a great number of variation thereto exists. Furthermore, it is appreciated that the described exemplary embodiments only illustrate non-limiting examples of how the present invention can be implemented and that it is not intended to limit the scope, the application or the configuration of the herein-described apparatus' and methods. Rather, the preceding description will provide the person skilled in the art with constructions for implementing at least one exemplary embodiment of the invention, wherein it has to be understood that various changes of functionality and the arrangement of the elements of the exemplary embodiment can be made, without deviating from the subject-matter defined by the appended claims and their legal equivalents.

LIST OF REFERENCE SIGNS

100 exemplary embodiment of a method of distinguishing different configuration states of an object
105-170 method steps of method 100
200 set of three original images
205-215 individual images of set 200
300 preprocessed set of images 200 with additional illustration of orientation descriptors
305-315 individual images of set 300
400 preprocessed set of images 200 with additional illustration of ROI defined by bounding box B 405-415 individual images of set 400
500 set of normalized images resulting from affine transformation
505-515 individual images of set 500
600 set of histograms based on normalized images 500
605-615 individual images of set 600
B bounding box, defining ROI
C geometrical center of object-related image points (of hand H)
G gap, respectively rows having a gap
H image of human hand (object)
H' image of human hand in normalized images 500
T image of fingertip of hand H

The invention claimed is:

1. A method of distinguishing different configuration states of an object based on an image representation of the object, the method comprising:
   acquiring original image data representing an original image comprising a picture of the object;
   detecting the object within the original image;
   determining an orientation of the detected object within the original image;
   determining within the original image a region-of-interest, ROI, representing the picture of the object at least in parts;
   generating normalized image data representing a two-dimensional normalized image by transforming the ROI of the original image based on the determined orientation of the object to a reference frame in which the ROI is represented by the normalized image with a predefined standard orientation and scaling;
   extracting one or more characteristic features of the object as represented by the normalized image data; and
   classifying the extracted one or more characteristic features according to a related classification scheme to determine among a set of two or more possible configuration states of the object a specific configuration state that is associated with the result of the classification;
   wherein the normalized image is a digital image and at least one of the characteristic features of the object is extracted based on histogram data, wherein the histogram data represents a histogram that associates each row of at least a subset of the rows of image points of the normalized image along a selected one of the normalized image's dimensions with a respective rate or number of object-related image points in the respective row, wherein an object-related image point is an image point that represents a respective portion of the object within the normalized image.

2. The method of claim 1, wherein the at least one characteristic feature of the object is extracted based on a ratio of the number or ratio of object-related image points in a first subset of the rows along said dimension of the normalized image and a number or ratio of object-related image points in a second, different subset of the rows of the same dimension of the normalized image.

3. The method of claim 1, further comprising:
   detecting within the normalized image at least a subset of those rows along said dimension of the normalized image that comprise multiple discrete row segments, each row segment consisting of object-related image points and each row segment being separate from its one or more neighboring row segments of the same row by a gap consisting of at least one image point that is not an object-related image point,
   wherein the extracting the at least one characteristic feature of the object is further based on the presence of one or more of such gaps in at least one of said rows of the normalized image.

4. The method of claim 3, wherein the extracting of the at least one characteristic feature of the object is based on one or more of the number, the sizes, the locations of the one or more gaps, and for at least one selected gap the number of contiguously neighboring rows having a corresponding gap being interconnected with the selected gap either directly or via one or more other gaps.

5. The method of claim 4, wherein the extracting of the at least one characteristic feature of the object based on the presence of one or more of gaps in at least one of said rows of the normalized image is predominantly or solely based on that set of gaps within the normalized image that comprises the greatest number of contiguously neighboring rows having a corresponding gap being interconnected with the selected gap either directly or via one or more other gaps.

6. The method of claim 3, wherein at least one of the gaps is identified by scanning a respective row of the normalized image for transitions from an object-related image point to a non-object-related image point and vice versa.

7. The method of claim 1, further comprising preprocessing the original image data before detecting the object therein to improve the image quality of the image represented by the original image data.

8. The method of claim 1, wherein determining the spatial orientation of the object within the original image is based on one or more of:
   an orientation of a bounding box enclosing the object, of a contour of the object, or of an arrangement of two or more extreme points on the contour of the object within the original image;
   a distribution of object-related image points within a bounding box enclosing the object;
   an orientation defined by the relative position of a specific extreme point of the object and the geometric center or the center of gravity of the object or another extreme point of the object;
   amplitude image data representing an amplitude image of the object and being provided as part of or in addition to the original image data; and
   depth image data representing a depth image of the object and being provided as part of or in addition to the original image data.

9. The method of claim 1, wherein generating the normalized image data comprises transforming the ROI to the reference frame by means of an affine transformation.

10. The method of claim 1, wherein generating the normalized image data comprises transforming the ROI to the reference frame in such a way that the thus-transformed image of the ROI completely coincides with the normalized image.

11. The method of claim 1, wherein the original image data comprises a sequence of contiguous image frames, and the method further comprises:
    maintaining history data representing for each image frame of at least a subset of the sequence the respective classification result that was previously determined for the corresponding image frame, wherein the subset is a contiguous series of image frames that each picture the object, at least in parts,
    wherein the determining a current configuration state of the object is based on the result of the classification of a current image frame and the history data.

12. The method of claim 11, wherein the current configuration state of the object is determined based on a majority decision or averaging with respect to the result of the classification of the current image frame and the classification results represented by the history data.

13. The method of claim 1, wherein the object is a human hand and the method is configured to distinguish, when a gesture is performed by the hand, a pointing gesture from a swiping gesture based on classifying one or more characteristic features of the hand being extracted from the normalized image data.

14. A non-transitory computer-readable storage medium comprising instructions that, when executed on a computer or multi-computer platform, cause the computer or multi-computer platform, respectively, to perform the method of claim 1.

15. An image processing apparatus for distinguishing different configuration states of an object based on an image representation of the object, the image processing apparatus being configured to perform the method of claim 1.

* * * * *